June 5, 1928.  
W. O. TURNIDGE ET AL  
1,672,588  
AUTOMATIC LEVELING CARRIAGE FRAME  
Filed May 7, 1927  2 Sheets-Sheet 1

INVENTOR.  
W. O. Turnidge & A. L. Turnidge,  
BY L. N. Gillis  
ATTORNEY.

June 5, 1928.　　　　　　　　　　　　　　　　　　　1,672,588
W. O. TURNIDGE ET AL
AUTOMATIC LEVELING CARRIAGE FRAME
Filed May 7, 1927　　　2 Sheets-Sheet 2
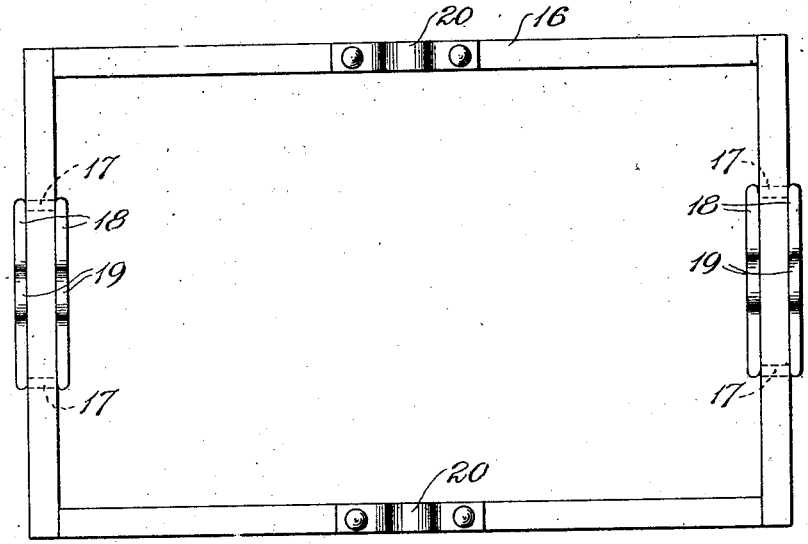
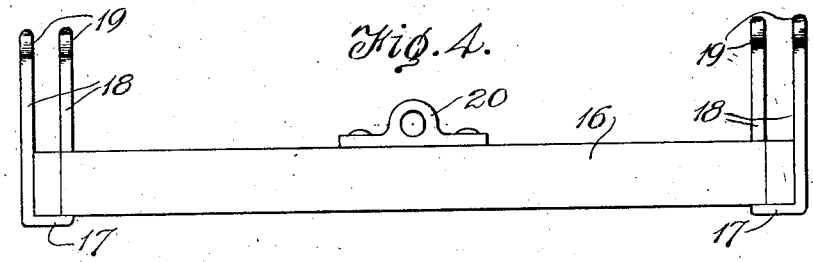
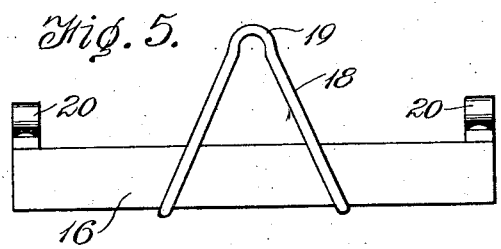
INVENTOR.
W. O. Turnidge & A. L. Turnidge,
BY
ATTORNEY.

Patented June 5, 1928.

1,672,588

UNITED STATES PATENT OFFICE.

WILLIAM O. TURNIDGE AND ARCHIBALD L. TURNIDGE, OF WEISER, IDAHO.

AUTOMATIC LEVELING CARRIAGE FRAME.

Application filed May 7, 1927. Serial No. 189,664.

This invention relates to carriages and vehicles and has special reference to an automatic leveling carriage frame particularly adapted for use with a side hill harvester and other like implements.

More especially the device is designed to be used for the purpose of carrying an automatic McCormick Deering harvester or any other machine to which it may be applied, the principal object of the invention being to maintain such harvester at all times in perfect level alignment while in operation on uneven or hill side land.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 3 is an enlarged plan view of a certain gimbal frame used in connection herewith.

Figure 4 is a side elevation thereof.

Figure 5 is an end view thereof.

Figure 1:
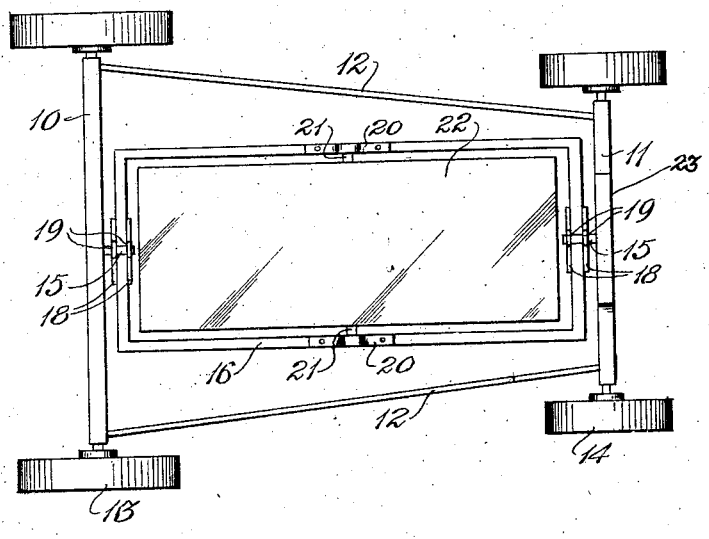
Figure 1 is a plan view of the device with the part of the harvester indicated by simple platforms.
Figure 2:
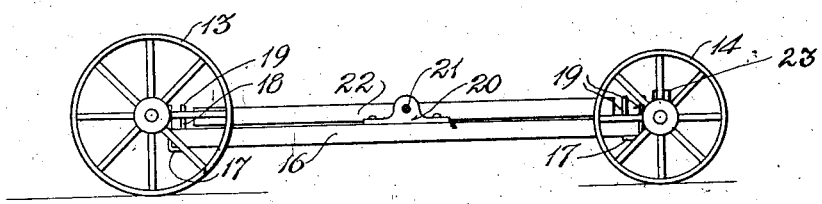
Figure 2 is a side elevation hereof.

In the embodiment of the invention herein disclosed there is shown a wheeled frame having a rear axle 10 and a front axle 11 which are connected by suitable hounds 12. These axles carry the rear wheels 13 and front wheels 14, the front wheels constituting steering wheels but the steering mechanism being omitted as forming no part of the present invention. Projecting forwardly from the rear axle and rearwardly from the front axle are pins 15 which lie in the same vertical plane, the rear pin 15 naturally being somewhat higher than the front pin 15.

At 16 is a rectangular frame having end members which are parallel to the axles 10 and 11 and on each of these end members is carried a stirrup consisting of an endless length of rod metal of general diamond shape and bent to provide parallel center portions 17 which lie beneath the respective end members of the frame 16, the remainder of the stirrup being bent up vertically to provide inwardly inclined sides 18 terminating at their upper ends in semi-circular portions 19 which engage over the respective pin 15. The rear stirrup is of course slightly longer than the front stirrup so that the frame 16 hangs horizontally from these pins 15. On each side member of the frame 16 there is provided a bearing 20 for the reception of pins 21 projecting from the harvester frame or platform 22 at its central portion.

Since the arrangement is such that the center of gravity of the swinging support is below the center of suspension the wheel frame may tilt laterally without disturbing the level position laterally of either the harvester frame 22 or the frame 16. Also the wheel frame may tilt longitudinally without disturbing the level position of the harvester frame or platform 22 since this is supported by the bearings 20. Thus no matter how the wheel frame is tilted by the unevenness of the ground the harvester will at all times remain level.

In order to bring the pins 15 in axial alignment a bolster 23 may be carried on one or both axles as the necessities of the case to the special construction may require so that one or both pins 15 may be inserted in or carried by such bolster or bolsters. Under these circumstances the front and rear stirrups will be of equal lengths.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a device of the kind described, a wheeled frame, a supplemental frame suspended therefrom for free rocking movement on axes extending longitudinally of said wheeled frame, and a harvester frame suspended from the supplemental frame for rocking movement on an axis transverse the supplemental frame.

2. In a device of the kind described, a wheeled frame including front and rear axles, pivot pins projecting from said axles toward each other stirrups hung from said pivot pins, a supplemental frame having front and rear members parallel to said axles and supported in said stirrups, said supplemental frame also having longitudinal side members, aligned bearings supported by said side members, and a harvester frame having aligned pivot pins engaged in said bearings.

In testimony whereof we affix our signatures.

WILLIAM O. TURNIDGE.
ARCHIBALD L. TURNIDGE.